United States Patent
Vayssiere

(10) Patent No.: US 7,270,276 B2
(45) Date of Patent: Sep. 18, 2007

(54) MULTI-APPLICATION SMARTCARD

(75) Inventor: Julien J P. Vayssiere, Red Hill (AU)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 10/954,382

(22) Filed: Sep. 29, 2004

(65) Prior Publication Data

US 2006/0065741 A1 Mar. 30, 2006

(51) Int. Cl.
*G06K 19/06* (2006.01)

(52) U.S. Cl. ................................. 235/492

(58) Field of Classification Search ............ 705/50; 235/492; 340/5.26
See application file for complete search history.

(56) References Cited

U.S. PATENT DOCUMENTS

| | | | |
|---|---|---|---|
| 2002/0116330 A1* | 8/2002 | Hed et al. | 705/39 |
| 2002/0167500 A1 | 11/2002 | Gelbman | |
| 2002/0180584 A1* | 12/2002 | McGregor et al. | 340/5.26 |
| 2002/0195493 A1* | 12/2002 | Dell | 235/451 |
| 2003/0024994 A1* | 2/2003 | Ladyansky | 235/492 |
| 2003/0085286 A1* | 5/2003 | Kelley et al. | 235/492 |
| 2003/0220876 A1* | 11/2003 | Burger et al. | 705/50 |
| 2005/0258229 A1* | 11/2005 | Minemura | 235/375 |

FOREIGN PATENT DOCUMENTS

WO WO 99/38117 7/1999
WO WO 2004053786 A1 * 6/2004

OTHER PUBLICATIONS

Bonsor: How Electronic Ink Will Work; http://electronics.howstuffworks.com/e-ink.htm/printable; 4 pages.
Wired News: Electronic Ink Makes Its Mark; http://www.wired.com/news/technology/0,1282,19457,00.html; 3 pages.
CardWerk: History of Smart Cards; http://www.cardwerk.com/smartcards/smartcard_history.aspx; 2 pages.
Application No. 05021322.2-2221; Reference: S 7810EU—ro; Extended European Search Report.

* cited by examiner

*Primary Examiner*—Michael G. Lee
*Assistant Examiner*—Tae W. Kim
(74) *Attorney, Agent, or Firm*—Blakely Sokoloff Taylor & Zafman LLP

(57) ABSTRACT

Numerous embodiments of an apparatus and method of a smartcard having a dynamic display portion. In one embodiment, the smartcard includes a dynamic display portion made of an electronic ink, in which the dynamic display portion changes from a first display to a second display in response to an application use of the smartcard.

11 Claims, 10 Drawing Sheets

MULTI-APPLICATION SMARTCARD

FIELD

This invention relates generally to the field smartcards and more specifically, a multi-application smartcard.

BACKGROUND

The term smartcard is used to describe any card with a capability to relate information to a particular application such as magnetic stripe, optical, memory, and microprocessor cards. FIG. 1 illustrates a typical microprocessor-type of smartcard includes a microprocessor and memory. No bigger than a credit card, smartcards contain a small microchip that can process and store thousands of bits of electronic data. Unlike passive devices (such as a memory card or magnetic stripe card) that can only store information, the smart card is active and able to process data in reacting to a given situation. This capability to record and modify information in its own non-volatile, physically protected memory makes the smartcard a powerful and practical tool.

Smartcards have the technical ability to host multiple applications. A single smartcard can therefore perform multiple functions such as, for example, credit card, calling card, stored value card, health care card or loyalty card. As such, a consumer would have to carry only one card for multiple applications. However, the problem with smartcards, and multi-application smartcards in particular, is that the logo printed on the card is permanently printed, and has to be shared by the companies behind the applications on the card. Because of the unwillingness of companies to agree to a particular appearance or logo for multi-application smartcards, consumers are left to carry around multiple smartcards, one for each particular application. Even if the companies could agree to a particular appearance, there would still be a problem of not being able to modify the appearance when an application is added or removed.

SUMMARY

Embodiments of a smartcard having a dynamic display portion are described herein. In one embodiment, the dynamic display portion may be made of an electronic ink, in which the dynamic display portion changes from a first display to a second display in response to an application use of the smartcard.

There are numerous other embodiments which are described herein, and these embodiments generally relate to multi-application smartcards that have to ability to change their appearance in connection with a particular application when used.

BRIEF DESCRIPTION OF THE DRAWINGS

Embodiments of the present invention are illustrated by way of example, and not limitation, in the figures of the accompanying drawings in which.

DETAILED DESCRIPTION

In the following description, numerous specific details are set forth such as examples of specific materials or components in order to provide a thorough understanding of embodiments of the present invention. It will be apparent, however, to one skilled in the art that these specific details need not be employed to practice embodiments of the present invention. In other instances, well known components or methods have not been described in detail in order to avoid unnecessarily obscuring embodiments of the present invention.

Any reference in the specification to "one embodiment" or "an embodiment" means that a particular feature, structure, or characteristic described in connection with the embodiment is included in at least one embodiment of the claimed subject matter. The appearances of the phrase, "in one embodiment" in various places in the specification are not necessarily all referring to the same embodiment.

Numerous embodiments of a method and apparatus for a multi-application smartcard are described. In one embodiment, a visible surface of the smartcard includes a dynamic display portion that changes from a first display to a second display, and in particular, to a display associated with the particular use of the smartcard. In one embodiment, the dynamic display portion may include electronic ink (E-ink) technology. This low-power technology allows us to change the display on the face of the card depending on which application is in use. When inserted into a payment terminal, for example, the face of the card would display the logo of the bank whose payment application is stored on the card. The card could also receive an external signal, for example using radio frequency identification (RFID) technology that also provides power, which provides the card with contextual information such as which store the user is walking into. The card would then turn into the loyalty card for that store. Additional applications and their associated logos can be dynamically uploaded to the card, and can also be removed or modified in the same way.

Figure 1:
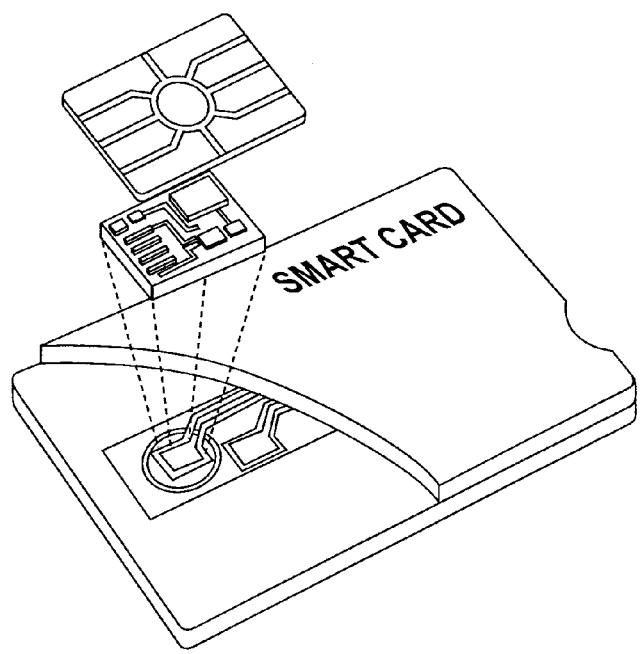
FIG. 1 illustrates a prior art smartcard.
Figure 2A:
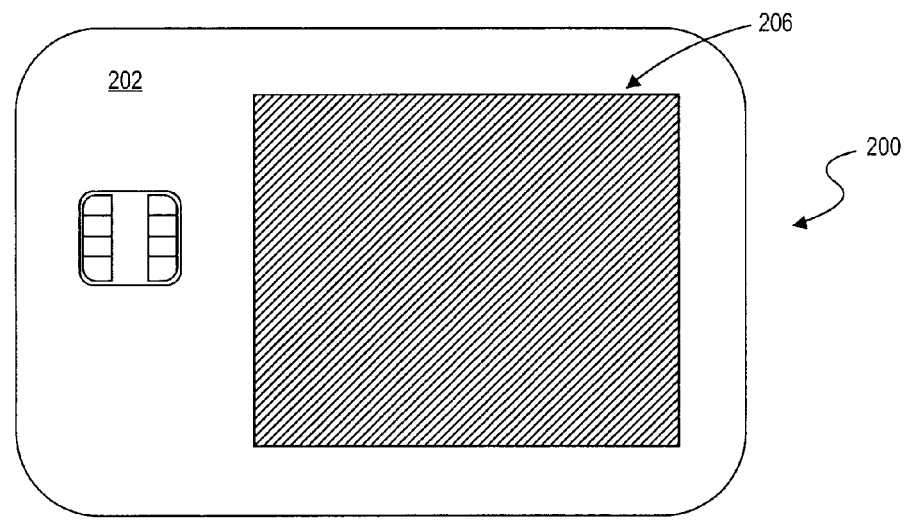
FIG. 2A illustrates a first side of a smartcard for one embodiment of the present invention.
Figure 2B:
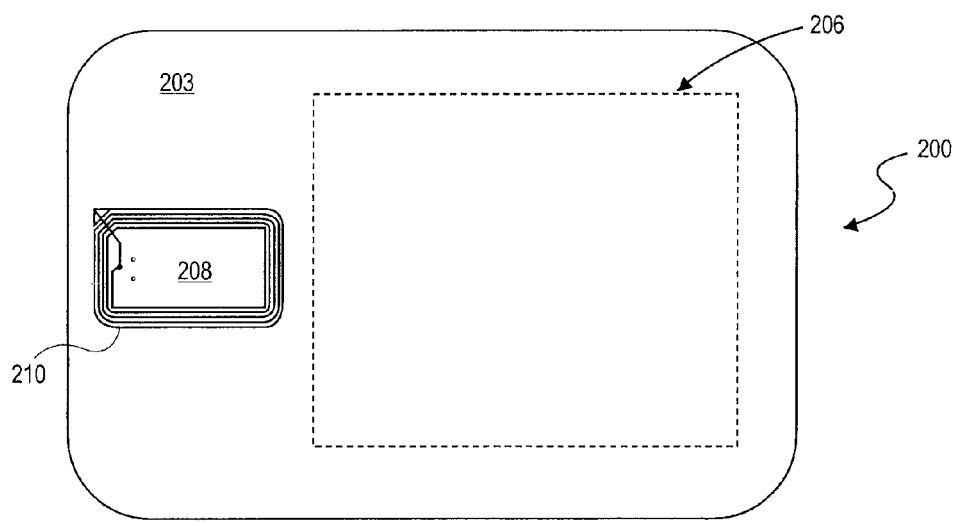
FIG. 2B illustrates a second side of the smartcard illustrated in FIG. 2A.

FIGS. 2A-2B illustrate one embodiment of a smartcard 200 of the present invention. FIG. 2A, which illustrates a first, or front side of smartcard 200 includes a first surface 202 with an integrated circuit (IC) 204 and a dynamic display portion 206 disposed thereon. IC 204 may include a microprocessor and memory. The microprocessor portion of IC 204 executes programmed instructions stored in the memory and as described in greater detail below, controls what particular display is shown on the face of smartcard 200. Various types of memory that may be part of IC 204 include Read Only Memory (ROM), Random Access Memory (RAM), and application memory such as Electrically Erasable Programmable Read-Only Memory (EEPROM). In an alternative embodiment, IC 204 may be any type of semiconductor-based device including but not limited to, a computer chip, carrier substrate, printed circuit board, or other computer components disposed on a printed circuit board. One more contact pads may be disposed on the surface of IC 204, with each contact pad dedicated to particular conditions, such as power supply voltage, clock signal, and ground. When smartcard 200 is inserted into a smartcard acceptance device or reader (not shown), such as a point of sale terminal, the metallic pads contact the reader's corresponding pins, allowing smartcard 200 to communicate with the reader.

A dynamic display portion 206 is also disposed on first surface 202 near IC 204 of smartcard 200. In one embodiment, dynamic display portion 206 contains color or imaging changing inks in order to alter the visual display of dynamic display portion 206, and in effect, alter the overall appearance of smartcard 200. In one particular embodiment of the present invention, dynamic display portion 206 may be embedded or printed with electronic ink (e-ink). E-ink is made of many microcapsules or cavities containing an ink or similar substance, as well as pigmented chips or balls with a negative charge floating inside the microcapsules. A negative or positive charge is applied to the microcapsules to create a desired text or image. In particular, when an electrical charge is-applied to the microcapsules, particular chips either rise to the top of the microcapsule to exhibit one color, or fall to the bottom to hide another color. Patterns of exhibited and hidden colors are used to created words or images. Electronic ink has the advantage of not requiring a permanent power supply for the display; power is only needed when the display needs to be changed. E-inks are known in the art; according, a detailed description is not provided herein. In an alternative embodiment, other types of dynamic inks, for example, thermochromatic ink, may be printed on dynamic display portion 206.

FIG. 2A illustrates dynamic display portion 206 occupying a substantial portion of first surface 202 (e.g., about 25% to about 75%). It may be appreciated that dynamic display portion 206 may occupy any amount of surface area of first surface 202, depending on the desired display (e.g., text, image, or logo). For example, the dynamic display portion may correspond to the entire first surface 202, except for IC 204.

In one embodiment, dynamic display portion 206 of smartcard 200 provides a user with a multi-application smartcard that allows multiple vendors to each use the whole face of the card for their logo, so as to provide the same "commercial exposure" as regular smartcard. Additionally, dynamic display portion 206 allows for the addition, modification, or removal of logos or images depending on the applications stored on the card. With multi-application features for smartcard 200, one physical appearance is associated with each application stored on the smartcard 200, and that particular physical appearance could automatically change depending on the context in which smartcard 200 is used.

The change in appearance could, in one embodiment, be limited to only first surface 202 of smartcard 200. For example, if smartcard 200 were used as a bank credit card, dynamic display portion 206 may display the logo of the bank issuing the credit card. With the e-ink display described herein, the display is linked to the card. As such, it is not possible for an external party to tamper with the intended logo or image. It becomes therefore possible to use dynamic display portion 206 for displaying the value currently held by smartcard 200, analogous to banknotes that have a value printed on them.

In one embodiment, smartcard 200 may also include an identification tag or device in order to identify the smartcard during a particular type of use. For example, smartcard 200 may be embedded with a radio frequency identification (RFID) tag or transmitter to communicate with a smartcard reader (not shown) information related to during an intended use of smartcard 200. FIG. 2B illustrates a second side 203 (i.e., backside) of smartcard 200 with a RFID tag 208 disposed thereon. RFID tag 208 may include a small IC microchip coupled to an antenna 210 (the microchip and antenna together may also be referred to as an RFID transponder or RFID tag). Antenna 210 enables the microchip to transmit identification information or other data to a reader. The reader converts the radio waves reflected back from the RFID tag into digital information that can then be passed on to application systems (e.g., a bank ATM machine) for approved use of smartcard 200. It may be appreciated that RFID tag 208 does not necessarily have be disposed on second side 203 of smartcard 200. In alternative embodiments, RFID tag 208 may be disposed anywhere on smartcard 200, including first side 202.

An RFID system may include a tag, which is made of a microchip or microprocessor, an antenna, and an interrogator or reader with an antenna. The reader sends out electromagnetic waves. The RFID tag antenna is tuned to receive these waves. A passive RFID tag draws power from field created by the reader and uses it to power the microchip's circuits. The chip then modulates the waves that the tag sends back to the reader and the reader converts the new waves into digital data. As such, in one embodiment, the reader for the RFID tag (e.g., RFID tag 208) does not require physical contact with the smartcard to communicate with the RFID tag. RFID tags are known in the art; accordingly, a detailed description is not provided herein. As such, power to smartcard 200 may be supplied when inserted into a smartcard reader. The reader provides power and, possibly performs some "management" operations on the smartcard, such as changing the logo of an application, or modifying/adding/removing an application. The smartcard, when powered, need to be able to understand in which context it is, and change the display accordingly. If smartcard 200 is inserted into a reader, the reader activates a particular application of smartcard 200 (for example, the prepaid phone function if the reader is a public phone), so the reader gives the context explicitly.

In an alternative embodiment, the context in which smartcard 200 is being used may be deduced or "guessed." For example, as the end user walks into a store through the anti-theft gates, the magnetic field generated by RFID tag 208 receiver may, in addition to powering smartcard 200, send a signal to smartcard 200 with the name of the store. If, for example, smartcard 200 stores an application for the "loyalty card" of the store, the logo displayed on the card (i.e., dynamic display 206) may also be changed as the end user walks into the store.

Figure 3:
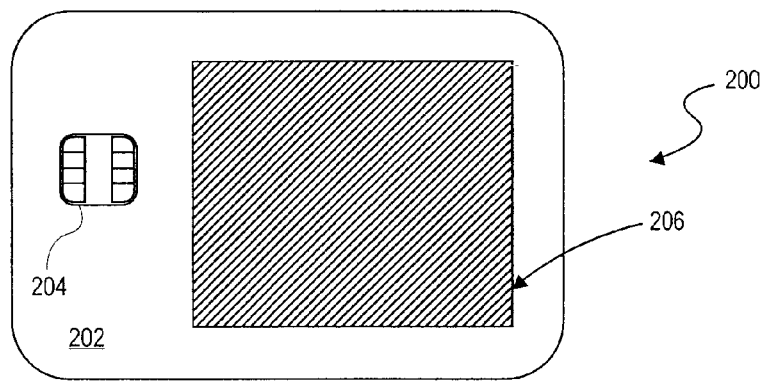
FIG. 3 illustrates one embodiment of a dynamic display portion disposed on a smartcard.
Figure 4:
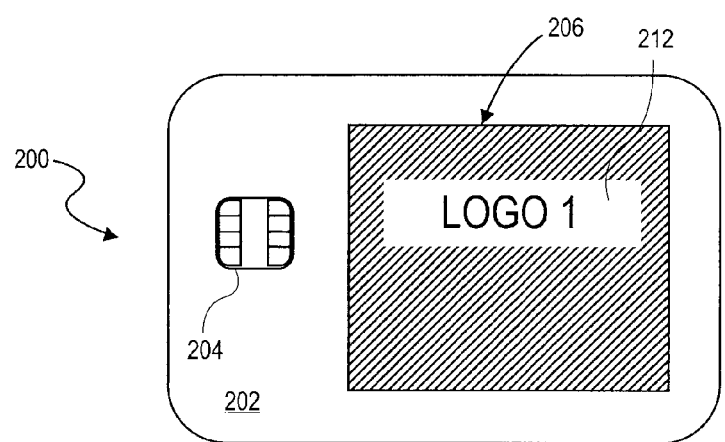
FIG. 4 illustrates another embodiment of a dynamic display portion disposed on a smartcard.
Figure 5:
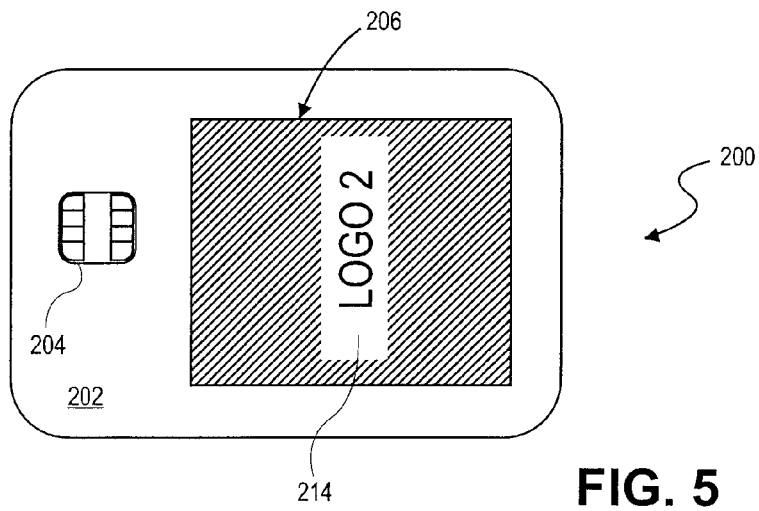
FIG. 5 illustrates another embodiment of a dynamic display portion disposed on a smartcard.

FIGS. 3-5 illustrate one embodiment of a multi-application scenario for smartcard 200. For exemplary purposes, FIGS. 3-5 are described for smartcard 200 in the context of two applications, one in a retail store and another in a phone booth. In a default or non-use state, dynamic display portion 206 of smartcard 200 may have a generic display or no type of display associated with a particular application, as illustrated in FIG. 3. When a user of smartcard 200 enters a retail shop by walking through gates that contain magnetic coils (which may exist in most large shops for anti-theft purposes) for RFID tag 208, power is transmitted to smartcard 200, as well as a message identifying the shop, or the brand name of the shop. This causes a change in the logo displayed on dynamic display portion 206 of smartcard 200 to the logo of, for example, the loyalty card of the shop. In one embodiment, the application for the loyalty program may be stored on smartcard 200. This change in logo display is represented by the generic notation "LOGO 1" 212, as illustrated in FIG. 4. As described above, dynamic display portion 206 may be printed with e-ink that changes to the associated logo or image for the shop. When the user leaves the store, the logo associated with the store disappears, and may revert back to the appearance illustrated in FIG. 3. The user may then use smartcard 200 in order to place a card with a payphone located in a telephone booth. When smartcard 200 is inserted into the reader of the payphone, dynamic display portion 206 changes again to the logo of the payphone service provider, or takes the appearance of the phone carrier's calling card. This change in logo appearance is represented by "LOGO 2" 214 illustrated in FIG. 5.

Figure 6:
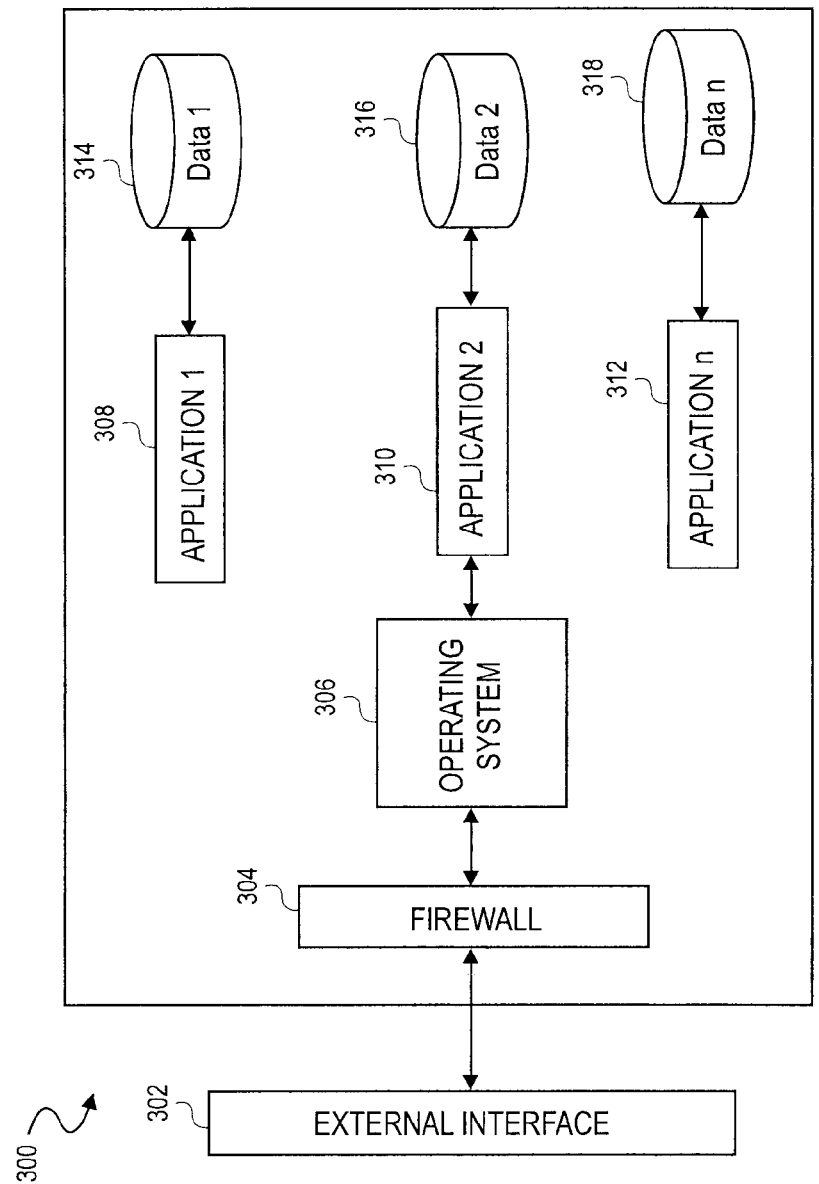
FIG. 6 illustrates a logic diagram of one embodiment of the architecture of a multi-application smartcard.

FIG. 6 illustrates a logic diagram of one embodiment of the internal architecture 300 of a multi-application smartcard (e.g., smartcard 200). Note that while FIG. 6 illustrates various components of a smartcard system, it is not intended to represent any particular architecture or manner of interconnecting the components as such details are not germane to the present invention. Smartcard 200 communicates with external interface 302 (e.g., a smartcard reader) by receiving commands and issuing replies to these commands. In one embodiment, commands may be divided into two groups. One type of command is Transmission Protocol Data Units (TPDUs), which are transport-level commands used for establishing and managing a connection between a reader and a smartcard. The second type of command is Application Protocol Data Units (APDUs), which are the commands and replies exchanged at an application level once a connection has been established. The smartcard also communicates to external interface 302 through firewall 304, a piece of software running on the smartcard that ensures data exchanged with external interface 302 follows the specifications of a protocol (e.g., for security purposes).

For the multi-application smartcard, the next block in the chain is the Operating System (OS) 306, which is responsible for the correct execution of the different applications (e.g., Application 1 (308) and Application 2 (310)) on the smartcard. In particular, OS 306 is responsible for the isolation of the different applications, i.e., making sure that the applications stored on the smartcard do not engage in cross-talk or read, write, modify, or delete data from each other. Any number of applications may be part of architecture 300, as designated by Application n (312).

Each application stored on the card has access to its own database. For example, Application 1 (308) is coupled to Data 1 (314), Application 2 (310) is coupled to Data 2 (316), and up to Application n (312) coupled to Data n (318). In one embodiment, a portion of each database may be read-only (e.g., implemented using ROM memory), while another portion of each database may be writeable, in addition to being readable.

In one embodiment, only one application (e.g., Application 2 (310)) may be active at a time. Application 2 (310) is active as illustrated by its connection to external interface 302 through OS 306 and firewall 304. As such, when a new application (e.g., Application 1 (308)) is initiated by OS 306, Application 2 (310) first shuts down.

Figure 7:
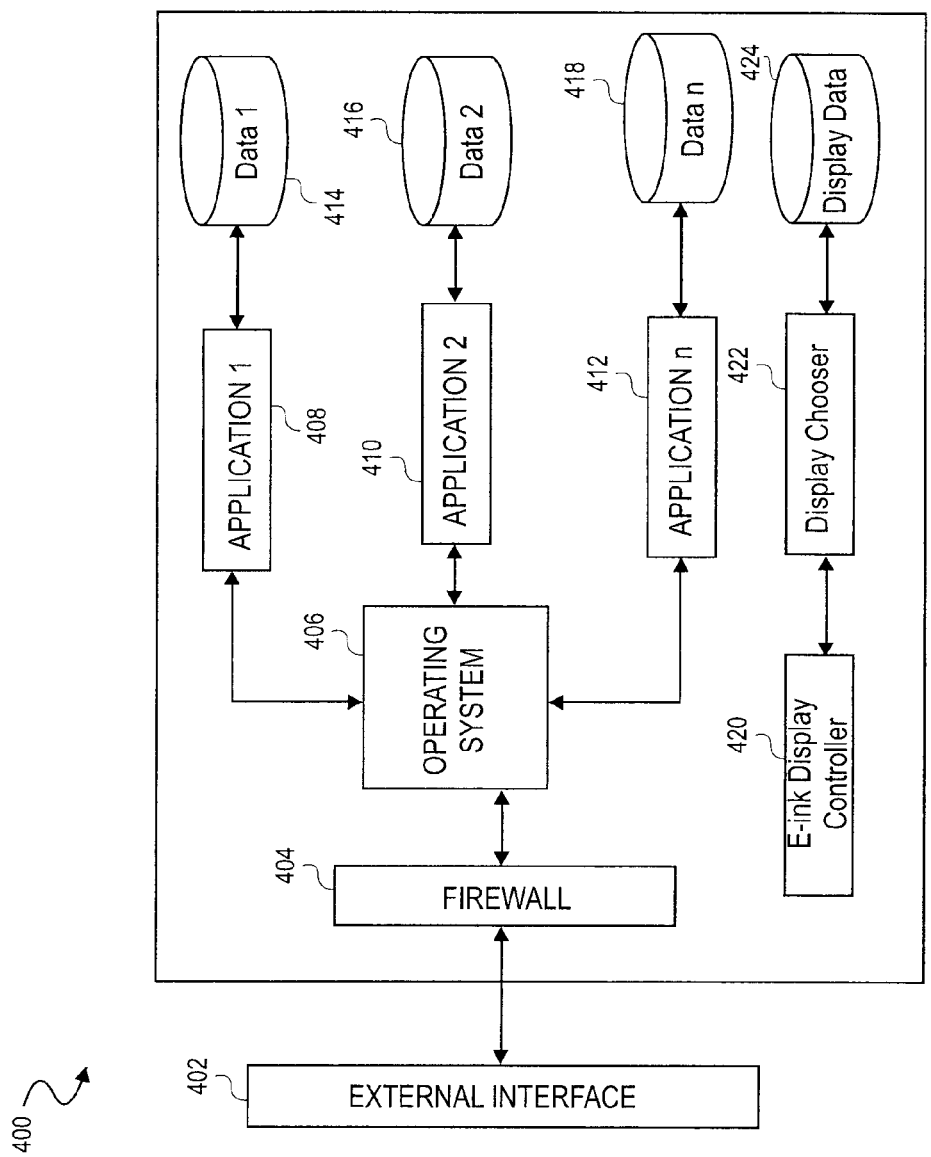
FIG. 7 illustrates a logic diagram of another embodiment of the architecture of a multi-application smartcard.

FIG. 7 illustrates a logic diagram of another embodiment of the internal architecture 400 of a multi-application smartcard (e.g., smartcard 200) that includes additional components relative to architecture 300 described above with respect to FIG. 6. In addition to firewall 404, OS 406, and the various applications/databases, architecture 400 also includes "Display Chooser" application 422 and E-ink display controller 420, a hardware device disposed on the smartcard that is responsible for updating the dynamic display portion (e.g., dynamic display portion 206). Display Data 424 is a database associated with Display Chooser application 422. Display Chooser application 422 communicates with E-ink Display Controller 420 by providing it with data describing which image (e.g., text or logo) to display on the dynamic display portion.

Figure 8:
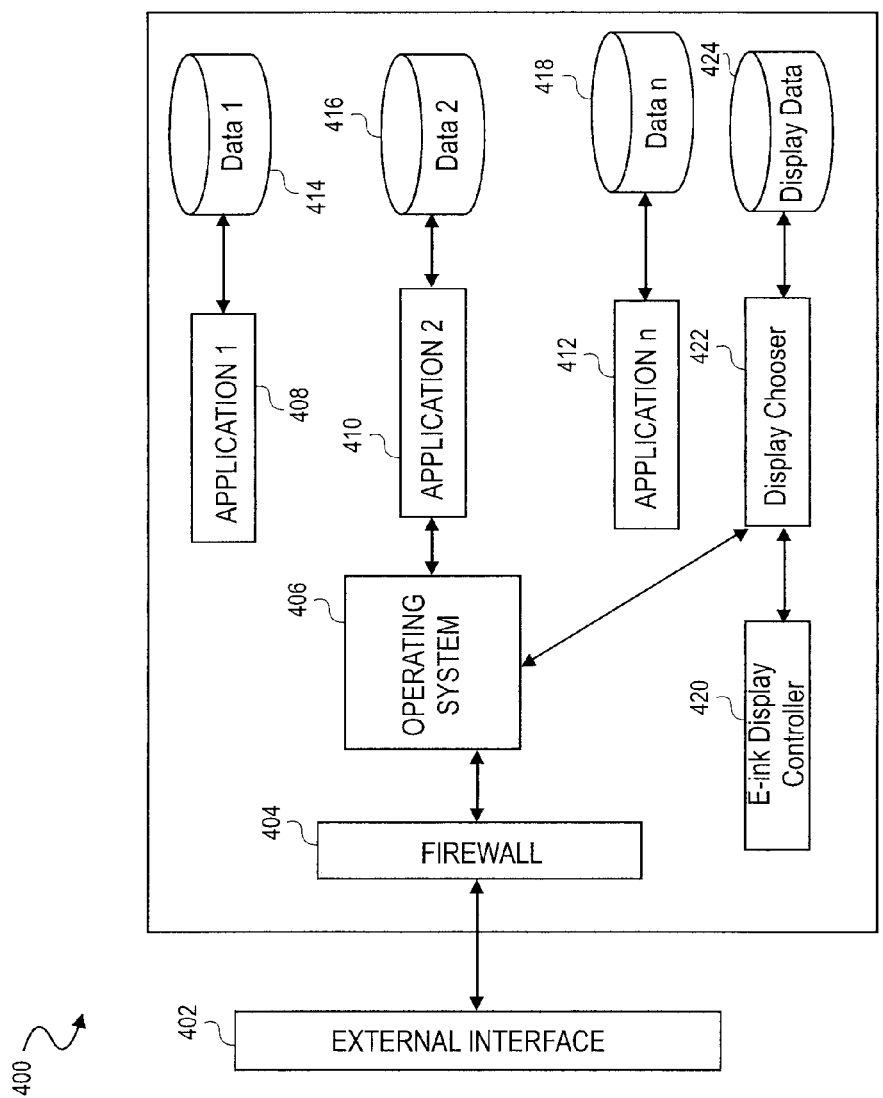
FIG. 8 illustrates a logic diagram of another embodiment of the architecture of a multi-application smartcard.

FIG. 8 illustrates one embodiment of the activity of the Display Chooser application during a particular use of the smartcard. For the purpose of explaining the activity of architecture 400, the use of the smartcard is described when used as a telephone calling card inserted into a public phone. When the reader of the public phone detects the smartcard, OS 406 first activates Display Chooser application 422. OS 406 sends to Display Chooser application 422 a command that indicates "Application 2 (410) is to be activated next." Display Chooser application 422 then retrieves from Display Data database 424 the necessary information for updating the dynamic display portion. This information may be, for example, a simple bitmap of an image. This image may represent the corporate logo of the phone company that issued the calling card. Display Chooser application 422 sends this information in the correct format to E-ink Display Controller 420.

When E-ink Display Controller 420 confirms that the dynamic display portion has been updated with the proper display, Display Chooser application 422 sends a reply to OS 406 acknowledging that the display has been properly updated OS 406 then activates the "Calling Card" application, for example, designated by Application 2 (410). When the user completes the use the smartcard as a calling card (e.g., smartcard is removed from the reader), Application 2 (410) terminates, and OS 406 activates Display Chooser application 422 again. The OS 406 issues a command to Display Chooser application 422 with the meaning of "Application 2 terminated." The Display Chooser application 422 then updates the dynamic display portion. For example, the image displayed may now be an image representing a mosaic of the logos of all the possible applications stored on the card, or the image may show "Multi-application smartcard," an advertisement, or a blank image.

Figure 9:
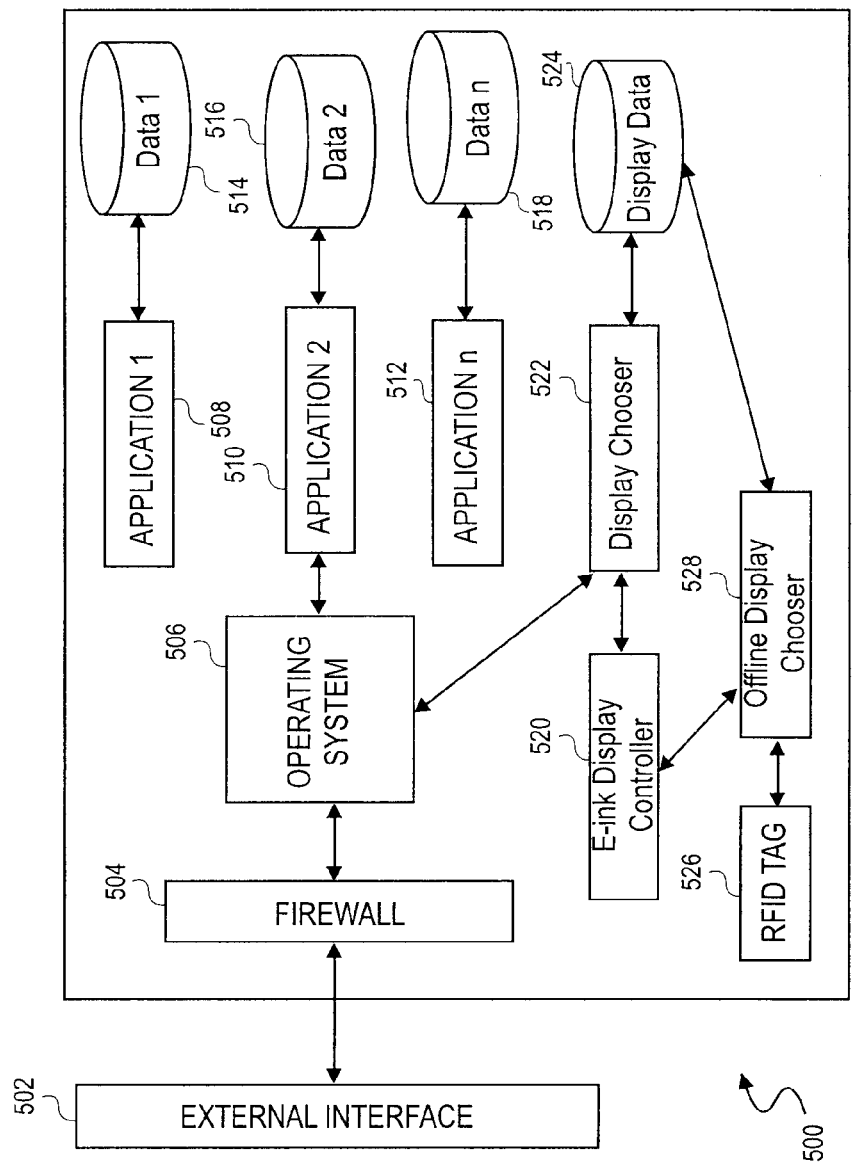
FIG. 9 illustrates a logic diagram of another embodiment of the architecture of a multi-application smartcard.

FIG. 9 illustrates another example of a smartcard architecture 500 that also includes RFID tag 526, which allows the smartcard to receive information from the smartcard reader, without the smartcard being physically inserted in a reader. This scenario may also be referred to as an "offline" interface. As described above, RFID tags receive both data and an energy source to power the smartcard from an external source, but without requiring physical contact or interface with the external source. In one embodiment, the amount of energy delivered to RFID tag 526 is used only for changing the dynamic display portion. Depending on the amount of power drawn from the smartcard reader, Offline Display Chooser 528 may be linked directly to e-ink display chooser 520 to determine the proper display to show on the dynamic display portion of the smartcard. Because Offline Display Chooser 528 is not coupled to display chooser application 522, less power is required to determine and change the display. In one embodiment, Offline Display Chooser 525 is a hardware component that does not require OS 506 for operation and is powered by the energy received by RFID tag 526.

In one method for updating the dynamic display portion by Offline Display Chooser 528, the image to be displayed is transmitted to RFID tag 526 externally, for example, as a bitmap image or as a compressed image that is decompressed by Offline Display Chooser 528. In an alternative method, RFID tag 526 only receives an identifier string that describes the environment (for example, name of bank or retail merchant environment in which the smartcard is to be used), which Offline Display Chooser 528 uses to look up in Display Data 524 for the corresponding image (if available). In one embodiment, the method by which the display is determined and updated may be similar to that described above with respect to FIG. 7.

Figure 10:
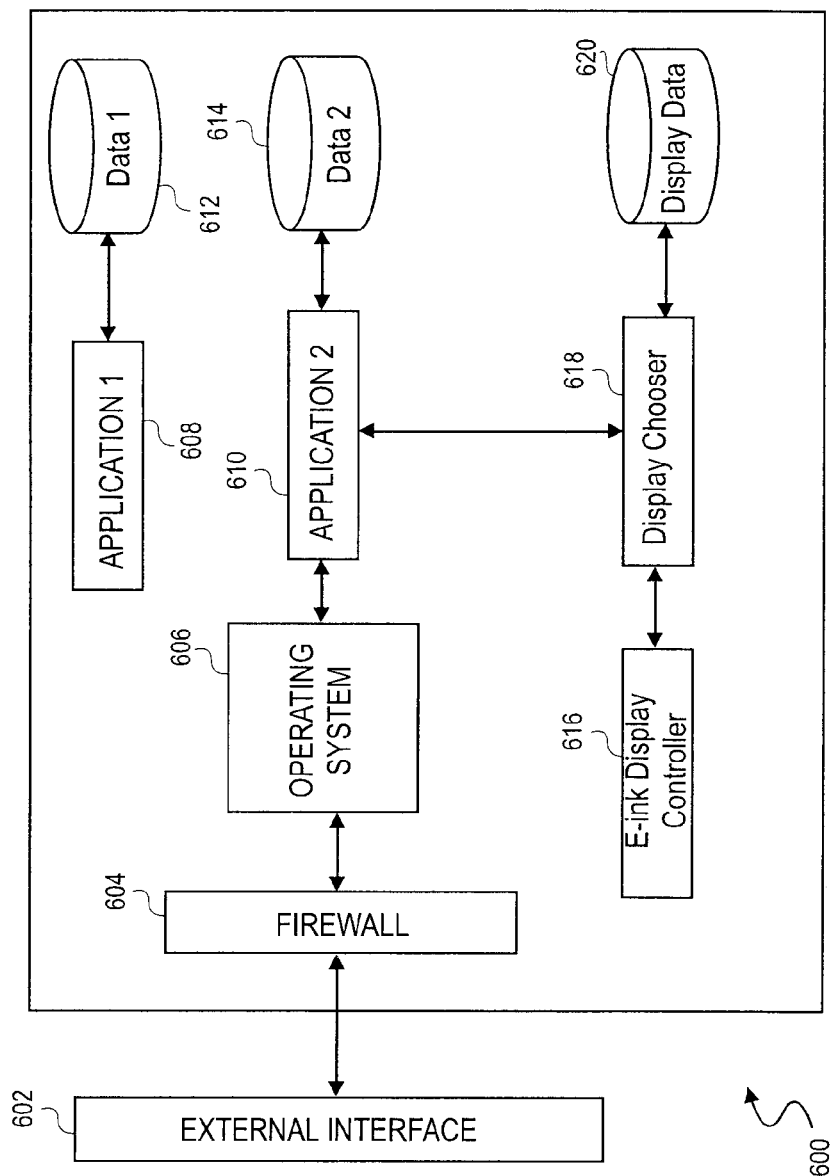
FIG. 10 illustrates a logic diagram of another embodiment of the architecture of a multi-application smartcard.

FIG. 10 illustrates another embodiment of a smartcard architecture 600 in which applications disposed on the smartcard may communicate between themselves, (i.e., commands and replies may be communicated between the different applications directly). In one embodiment, communication may exist between a particular application (e.g., Application 2 (610)) and Display Chooser application 618. This interaction allows for Application 2 (610) to update the dynamic display portion in real-time. For example, a stored-value application could use the electronic ink display for displaying the amount left. There may be multiple methods for communication between Application 2 (610) and Display Chooser application 618. In one method, Application 2 (610) sends complete pictures to Display Chooser application 618, which then updates the dynamic display portion similar to that of an image obtained from Display Data 620. In an alternative method, Application 2 (610) may send text which is displayed line by line to generate a complete image.

Figure 11:
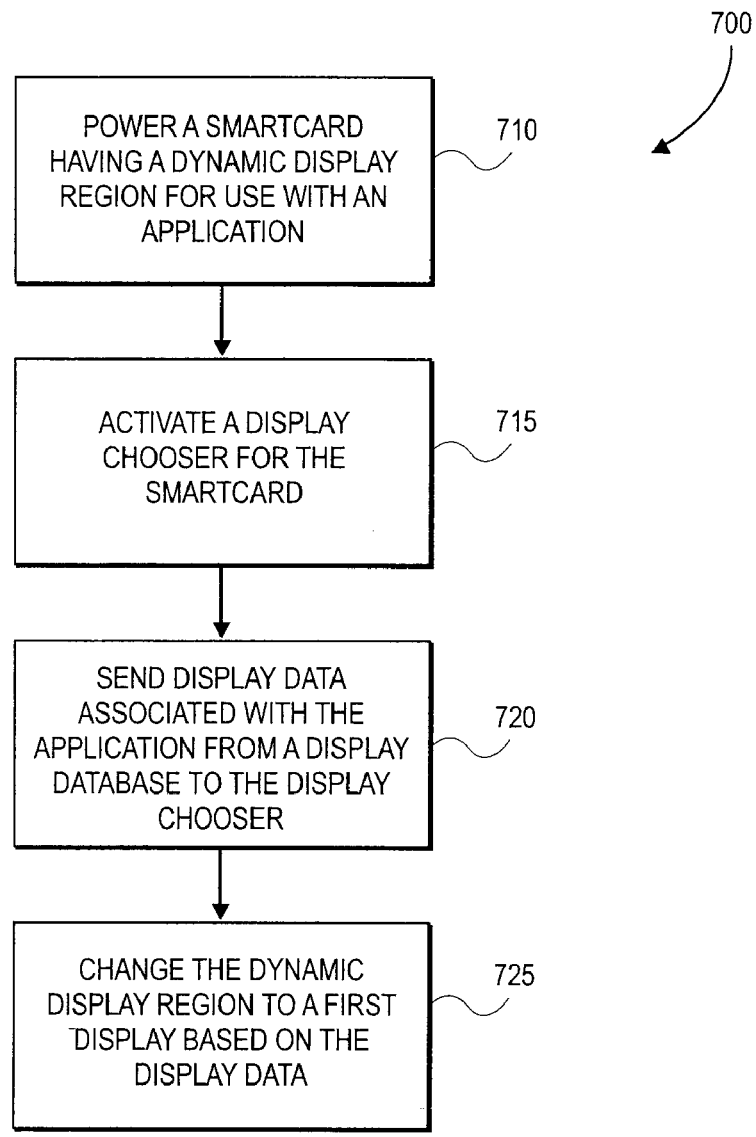
FIG. 11 illustrates a block diagram of one method for updating a dynamic display portion disposed on a multi-application smartcard.

FIG. 11 illustrates a block diagram of one method for updating a dynamic display portion disposed on a multi-application smartcard. A multi-application smartcard (e.g., smartcard 200 described above) includes a dynamic display portion that may be embedded with electronic ink. The smartcard, in one embodiment, may be loaded with multiple applications so that the smartcard may be used as, for example, a calling card, bank card, health card, etc. In addition, images, logos, or displays associated with each application may also be stored in a database on the smartcard. When used for a particular application (e.g., as a payphone calling card), the smartcard is first powered through the interface with a smartcard reader, block 710. The interface activates a display chooser (e.g., display chooser 422) to link or associate the proper application data and database stored on the smartcard with the application, for example, calling card credit stored on smartcard for use with the pay phone, block 715.

Next, display data associated with the application is sent from the display database (e.g., display data 424) to the display chooser, block 720. In one embodiment, an electronic ink controller (e.g., electronic ink controller 420) may also be disposed on the smartcard to control the interaction between the display chooser and the dynamic display portion (e.g., 206). With the proper display data retrieved, the dynamic display portion is changed or updated with the image associated with the application, block 725. In one embodiment, the dynamic display portion is updated by applying a charge to the electronic ink to generate the appropriate image. Upon completion of use (e.g., smartcard is removed from pay phone reader), the dynamic display portion may be updated again to display no image or a generic image that is not associated with any particular application.

Figure 12:
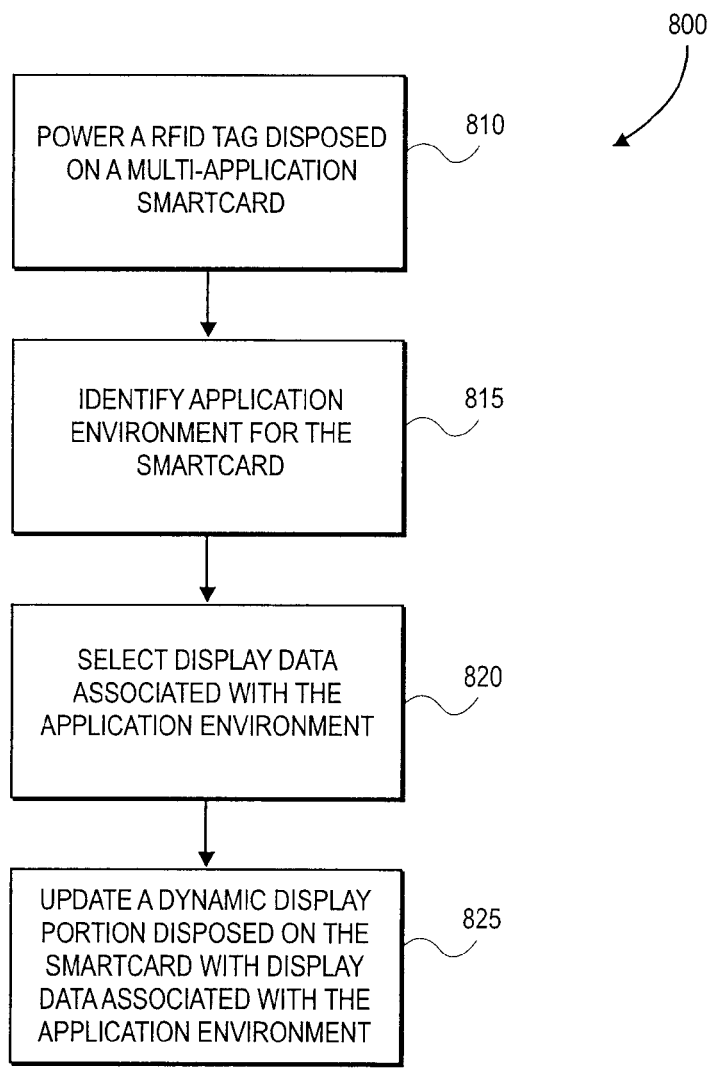
FIG. 12 illustrates a block diagram of another method for updating a dynamic display portion disposed on a multi-application smartcard.

FIG. 12 illustrates a block diagram of one method for updating a dynamic display portion disposed on a multi-application smartcard. In this embodiment, the smartcard may also include a radio frequency identification tag disposed thereon (e.g., RFID 208). Use of the smartcard is first initiated by powering the RFID tag, block 810. For example, the RFID tag may convert electromagnetic waves from a smartcard reader to power the smartcard. In one embodiment, the interface between the RFID tag smartcard does not require physical contact with the smartcard reader. Through the RFID tag, the smartcard may recognize the application environment for which the smartcard is to be used, block 815. For example, the smartcard may receive application data from the smartcard reader.

Next, display data associated with the application is sent from a display database to a display chooser. In one embodiment, an electronic ink controller (e.g., electronic ink controller 520) may also be disposed on the smartcard to control the interaction between the display chooser and the dynamic display portion. Alternatively, the display chooser may be an offline component to draw less power from the smartcard. The smartcard may then select display data associated with the application environment, block 820. With the proper display data retrieved, the dynamic display portion is changed or updated with the display data associated with the application environment, block 825. In an alternative embodiment, the display chooser may retrieve display data directly from an application database stored on the smartcard instead of from a display database.

In the foregoing specification, the invention is described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A smartcard, comprising:
   a microprocessor to execute a plurality of applications;
   a radio frequency identification tag;
   a dynamic display portion to change a presented display image in response to receiving one of a plurality of display data sets;
   a first display chooser to send a first of the plurality of display data sets to the display portion in response to the identification tag receiving a block of display information; and
   a second display chooser, to send a second of the plurality of display data sets to the display portion in response to a command from one of the applications.

2. The smartcard of claim 1, wherein the first display chooser is a hardware component that does not require the microprocessor for operation.

3. The smartcard of claim 1, wherein the radio frequency identification tag further to exclusively provide power to the first display chooser.

4. The smartcard of claim 3, wherein the radio frequency identification tag further to exclusively provide power to the dynamic display portion to change the display image in response to the identification tag receiving the block of display information.

5. The smartcard of claim 1, wherein the second display chooser is another application executed by the microprocessor.

6. The smartcard of claim 1, further comprising a memory to store a portion of the plurality of display data sets.

7. The smartcard of claim 1, wherein the block of display information comprises the first display data set.

8. The smartcard of claim 1,
wherein the block of display information comprises an identifier string; and
wherein the first display chooser further to choose as the first display data set, from the plurality of data sets, a set associated with the identifier string.

9. A method, comprising:
providing a smartcard having a microprocessor, a dynamic display portion, a radio frequency identification tag, a first display chooser and a second display chooser;
sending a first of a plurality of display data sets from the first display chooser to the dynamic display portion in response to the identification tag receiving a block of display information;
sending a second of a plurality of display data sets from the second display chooser to the dynamic display portion in response to the second display chooser receiving a command from an application executed by the microprocessor; and
changing an image presented by the dynamic display portion in response to the dynamic display portion receiving one of the plurality of display data sets.

10. The method of claim 9, further comprising powering the first display chooser exclusively with energy received by the identification tag.

11. The method of claim 10, further comprising powering the dynamic display portion, when changing the display image in response to the identification tag receiving the block of display information, exclusively with energy received by the identification tag.

* * * * *